(12) United States Patent
Shapiro et al.

(10) Patent No.: US 7,277,827 B2
(45) Date of Patent: Oct. 2, 2007

(54) DEVICE TESTING FRAMEWORK FOR CREATING DEVICE-CENTRIC SCENARIO-BASED AUTOMATED TESTS

(75) Inventors: Adam Jonathan Shapiro, Seattle, WA (US); Dieter G. Achtelstetter, Redmond, WA (US); Travis J. Martin, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/289,247

(22) Filed: Nov. 29, 2005

(65) Prior Publication Data

US 2007/0124114 A1    May 31, 2007

(51) Int. Cl.
*G06F 11/00* (2006.01)

(52) U.S. Cl. .............. 702/188; 702/119; 702/123; 717/124

(58) Field of Classification Search ............. 702/188, 702/119
See application file for complete search history.

(56) References Cited

U.S. PATENT DOCUMENTS

| | | | |
|---|---|---|---|
| 6,195,774 B1* | 2/2001 | Jacobson | 714/727 |
| 7,020,573 B2* | 3/2006 | Wheeler et al. | 702/121 |
| 7,069,542 B2* | 6/2006 | Daly | 717/126 |
| 2004/0267485 A1* | 12/2004 | Penov et al. | 702/119 |
| 2005/0223360 A1* | 10/2005 | Seeman et al. | 717/124 |
| 2005/0229161 A1* | 10/2005 | Wang et al. | 717/125 |
| 2006/0026506 A1* | 2/2006 | Kristiansen et al. | 715/517 |

* cited by examiner

*Primary Examiner*—Hal Wachsman
(74) *Attorney, Agent, or Firm*—Amin, Turocy & Calvin LLP (57) ABSTRACT

A target test framework and method are provided which can enable scenario writer(s) to design and implement driver test(s) by providing a platform to build scenario-based automated tests for device(s) and device driver(s) by using a set of components designed for target testing. The framework enables scenario writer(s) to perform a set of actions across different types device(s). The framework further enables the testing of technology areas common to many targets (e.g., plug and play, power management, install/uninstall, security etc.). Additionally, the framework facilitates automatic identification and/or running of prewritten core functionality test that apply to a particular device. The framework further can allow runtime control of tests and the combining of framework components to form new device functionality tests and large scale scenarios.

15 Claims, 4 Drawing Sheets

DEVICE TESTING FRAMEWORK FOR CREATING DEVICE-CENTRIC SCENARIO-BASED AUTOMATED TESTS

BACKGROUND

Traditionally, testing devices and device drivers has been a highly manual process. These manual tests are time consuming and expensive to run in a consistent way. Even when these tests are automated, the resulting automation code has several problems. The existing automated tests for devices and device drivers require a high level of knowledge about specific hardware devices and technologies in order to write code to control and test these devices. Further, the automated tests include monolithic code that cannot be easily maintained over time and are difficult to modify or re-use, and do not lend themselves to componentization (e.g., being a part of another test). Finally, the automated tests are difficult to code (e.g., written in C or C++) and cannot generally be interrupted and restarted.

Additionally, the conventional test architecture has organizational efficiency problems. First, it is difficult to distribute test automation efforts. Additionally, tests do not generally record metrics in any consistent way (e.g., success or failure, number of executions, devices tested etc.)

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A target test framework and method are provided. The framework can enable scenario writer(s) to design and implement driver test(s) by providing a platform to build scenario-based automated tests for device(s) and device driver(s) by using a set of components designed for device testing. With the framework, test developer(s) can focus on developing test scenarios rather than having to build the underlying infrastructure. The framework enables scenario writer(s) to perform a set of actions across different types of target(s) (e.g., device(s)) without having to understand the detail of how those actions are implemented for each device. The framework further enables the testing of technology areas common to many devices (e.g., plug and play, power management, install/uninstall, security etc.)

The framework empowers test developer(s) to build device-centric scenario-based automated tests that are easy to create, manage, reuse, and extend. The framework is comprised primarily of an object model for devices; where each device is thought of as a "Target" of testing. These target object(s) can be queried for action and manageable test interface(s) that can be used to manipulate the target. The framework allows test developer(s) to manipulate and test a wide variety of devices in a consistent way, by focusing on the capabilities that are common across all devices (sometimes just common for a device classes). For example, many devices have Power Management capabilities and are PnP compatible. By focusing on the actions and characteristics of devices in the system, rather than on the specific hardware device, the framework simplifies the creation, maintenance, and execution of automated tests. Where tests must control the specifics of their device class, interfaces can be created to support this kind of testing within the framework.

The framework includes one or more action object(s). An action object comprises compatible control code for a specific device. Each action object contains the code necessary to control a specific device, and provides an interface with method(s) to control that device. Action object(s) facilitate extensibility of the system as additional action object(s) can be added as new hardware device(s) need to be tested. In one example, the framework can programmatically find and load applicable action object(s).

The framework can further include one or more manageable test(s) (MT). An MT comprises compatible test(s) for a specific device and can employ the action object(s) to perform the test(s). In one example, each MT contains the code of a common test scenario (a set of action(s)) necessary to control a specific device, and provides an interface with method(s) to control that test. MT(s) are controllable at runtime (e.g., start, stop, pause, resume, change test input etc.). Unlike traditional tests, MT(s) can be started, paused, and restarted while maintaining state.

MT(s) can be a set of core, target-specific test components. MT(s) can be small test components that focus on one particular functional test for a specific piece of hardware. For example, there can be a family of "SimpleIO" MT(s) for USB devices, 1394 devices, mass storage etc. The MT(s) allow run time control such as pause, restart, throttle-up, throttle-down etc.

Optionally, the framework can supply a set of object models that represent common functionality across many types of devices. These objects can be employed, for example, when a scenario writer desires to manipulate one or many devices that have similar functionality. For example, a scenario writer can disable the devices which are PNP enabled with a few simple lines of script.

One of these object models is a target object. The framework can include one or more target object(s), each of which represents a particular device attached to the system. Another of these object models is a target collection object. The target collection object contains one or more target object(s). In one example, the target collection object can be populated by using a query against a device depot object. The target collection object enables a script writer to operate on a collection of target(s) (e.g., devices) simultaneously as a group.

Further, the target object and target collection object can implement polymorphic behavior. That is, depending on what type of device is being tested, the implementation of a method on the target object can be different. For example, the Disable( ) method can have different implementations for USB device and 1394 devices. Instead of bundling many different implementations of a method into the target object (typically by using function overloading), the framework stores the method implementations for a specific action on a specific hardware type separately from the target object. So, there can be a family of methods for any single action on the framework object. The framework automatically runs the correct version of the method for the device being tested.

From the scenario writer's perspective, the framework allows the scenario writer to do several basic types of activities. First, the framework can allow the scenario writer to discover device(s) attached to the system. For example, the device(s) can be found by technology (e.g., USB, Bluetooth, etc.), by device class (e.g., storage device, HID, etc.) and/or by other criteria. The scenario writer can even identify a single device by name and/or search for device(s) by multiple criteria. In addition, the scenario writer can search for device(s) necessary to run a particular test and/or for device(s) that are related to each other (e.g., via parent-child, graph relationships, etc.) Optionally, the framework further allows a scenario writer to create collection(s) of device objects in order to act on them as one.

Additionally, a scenario writer can perform action(s) on one or more devices that have similar functionality as a group, without having to worry about the differences between individual devices. For example, a scenario writer can enable or disable a collection of devices, with a single line of script, even though the underlying code to implement this action may be different for each particular device. In addition, the scenario writer can cycle a collection of devices through several power management states and record the results. The framework finds and associates the underlying code with a specific device.

Next, a scenario writer can run basic functionality tests for a collection of devices, without worrying about the code needed to test each specific device. For example, the scenario writer can run a simple IO test that opens a device/file, writes some data, reads some data, and closes the device/file. Even though the code needed to do this is different for different devices, the scenario writer only needs to write a few simple lines of code to run the test. The framework understands what actions must be done in order to run the test for each type of hardware, and associates the underlying code with a specific device.

Finally, scenario writer(s) can programmatically, stop, restart, or pause a core functionality test. Traditionally, hardware test scripts consist of large C language programs that once started, run until complete. If the test is stopped for any reason, any state information was lost, and the test must be started over from the beginning. Some tests may take many hours to run to completion, and could not be restarted after detecting a problem. The MT(s) can preserve state information and can be paused and restarted to continue testing.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features of the claimed subject matter may become apparent from the following detailed description when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes (e.g., data from one component interacting with another component in a local system, distributed system, and/or across a network such as the Internet with other systems. Computer components can be stored, for example, on computer readable media including, but not limited to, an ASIC (application specific integrated circuit), CD (compact disc), DYD (digital video disk), ROM (read only memory), floppy disk, hard disk, LEPROM (electrically erasable programmable read only memory) and memory stick in accordance with the claimed subject matter. Further, the term "device(s)" is intended to encompass hardware component(s) and/or software component(s).

Figure 1:
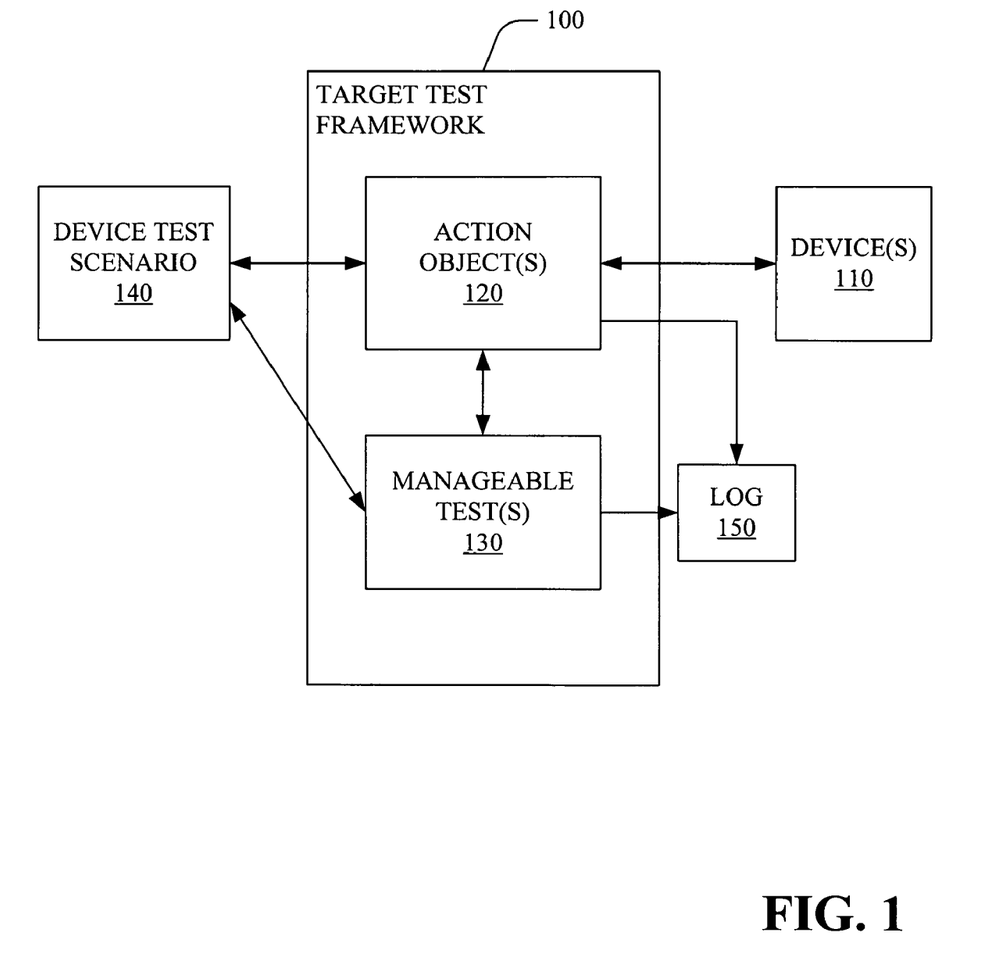
FIG. 1 is a block diagram of a target test framework.

Referring to FIG. 1, a target test framework 100 is illustrated. The framework 100 can enable scenario writer(s) to design and implement driver test(s) by providing a platform to build scenario-based automated tests for device(s) 110 and device driver(s) by using a set of components designed for target testing. With the framework 100, test developer(s) can focus on developing test scenarios rather than having to build the underlying infrastructure. The framework 100 enables scenario writer(s) to perform a set of actions across different types of device(s) 110 without having to understand the detail of how those actions are implemented for each device 110. The framework 100 further enables the testing of technology areas common to many devices (e.g., plug and play, power management, install/uninstall, security etc.)

The framework 100 empowers test developers to build device-centric scenario-based automated tests that are easy to create, manage, reuse, and extend. The framework 100 is comprised primarily of an object model for devices; where each device is thought of as a "Target" of testing. These target object(s) can be queried for action and manageable test interfaces that can be used to manipulate the target. The framework 100 allows test developer(s) to manipulate and test a wide variety of devices in a consistent way, by focusing on the capabilities that are common across all devices (sometimes just common for a device classes). For example, many devices have Power Management capabilities and are PnP compatible. By focusing on the actions and characteristics of devices in the system, rather than on the specific hardware device, the framework simplifies the creation, maintenance, and execution of automated tests. Where tests must control the specifics of their device class, interfaces can be created to support this kind of testing within the framework.

Additionally, the framework 100 facilitates automatic identification and/or running of prewritten core functionality test that apply to a particular device. The framework 100 further can allow runtime control of tests and the combining of framework components to form new device functionality tests and large scale scenarios.

Figure 2:
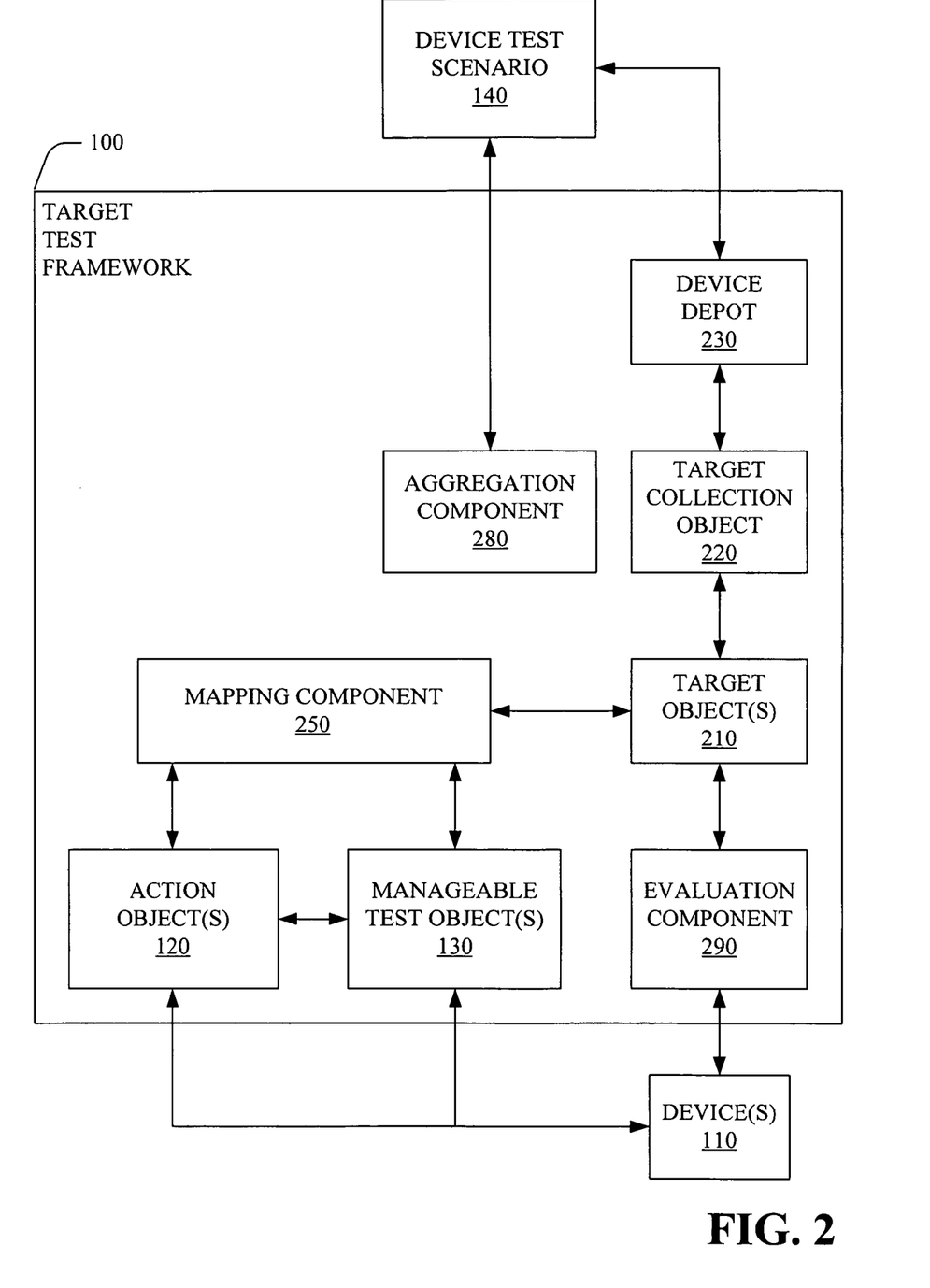
FIG. 2 is a block diagram of a target test framework.

Referring briefly to FIG. 2, the framework 100 can optionally supply a set of object models that represent common functionality across many types of devices. These objects can be employed, for example, when a scenario writer desires to manipulate one or many devices that have similar functionality. For example, a scenario writer can disable the devices which are PNP enabled with a few simple lines of script.

One of these object models is a target object 210. The framework 100 can include one or more target object(s) 210, each of which represents a particular device attached to the system. In one example, the target object 210 includes the following methods:

TABLE 1

| Target methods | |
|---|---|
| GetRelations | This method can be used by scenario writers to retrieve related Target objects. These relations can be dynamically calculated at runtime. |
| GetValue | This method can be used by scenario writers to retrieve the dynamic properties of the Target |
| GetInterface | This method attempts to dynamically locate an Action or MTest for the Target. Because Action (and MTest) objects use the Mapping Component 250 to specify a set of property values in a way that the Eval method can understand, Eval can be used within the Mapping Component 250 to perform the operation of matching implementations of Action and MTest interfaces at runtime. |
| Eval | This method takes an input that specifies a set of property values for this and Related Target objects. It returns a Boolean "true"/"false" indicating whether the specified property values match the dynamic properties of the Target object. It can be used to Evaluate the dynamic properties of the Target and related Target objects. This method can be used primarily within the algorithm that implements GetInterface, but can also be used by the scenario writer directly |

Another of these object models is a target collection object 220. The target collection object 220 contains one or more target object(s). In one example, the target collection object 220 can be populated by using a query against a device depot object 230, as discussed below. The target collection object 220 enables a script writer to operate on a collection of device(s) 110 simultaneously as a group.

The target collection object 220 can be returned by a query( ) method, but can also be instantiated by a scenario writer. In one example, the target collection object includes the following methods and events:

TABLE 2

| DeviceCollection methods. | |
|---|---|
| Enumeration interface | Method to enumerate all target object(s) 210 in the collection. |
| Add | Method to add a Target object 210 to the collection. |
| Remove | Method to Remove a Target object 210 from the collection. |
| Query | Method to retrieve a sub-set of the contained target object(s) 210 packed into a target collection object. The sub-set can be specified by providing a set of property values that can be understood by the Eval( ) method of the target object 210. |

Further, the target object 210 and target collection object 220 can implement polymorphic behavior. That is, depending on what type of device is being tested, the implementation of a method on the target object 210 can be different. For example, the Disable( ) method can have different implementations for USB device and 1394 devices. Instead of bundling many different implementations of a method into the target object 210 (typically by using function overloading), the framework 100 stores the method implementations for a specific action on a specific hardware type separately from the target object 210. So, there can be a family of methods for any single action on the framework 100 object. The framework 100 automatically runs the correct version of the method for the device being tested.

Returning to FIG. 1, the framework 100 includes one or more action object(s) 120 (e.g., stored in a library of action object(s) 120). An action object 120 comprises compatible control code for a specific device. Each action object 120 contains the code necessary to control a specific device, and provides an interface with method(s) to control that device. Action object(s) 120 facilitate extensibility of the system as additional Action object(s) 120 can be added as new hardware device(s) need to be tested.

In one example, the framework 100 can programmatically find and load applicable action object(s) 120. Thus, these method implementations can be stored and loaded dynamically as needed, as discussed below.

The framework 100 accordingly allows test case writers to perform simple actions (e.g., "Disable", "SurpriseRemove", or "EnableWake"), on whole collections of devices without having to understand how these methods are implemented or even understanding that they may be implemented differently for every device in the collection. For example, "SurpriseRemove( )" can operate on some devices by using a software simulation, but other devices might depend on physical automation hardware in order to accomplish the same task. Similarly, "EnableWake( )" for a network card, can require an external server available to ping the machine while the test machine is in suspend mode. Again, the framework 100 architecture allows the script writer to ignore these differences in implementation.

Manageable Test(s) (MT) 130

The framework 100 can further include one or more manageable test(s) (MT) 130 (e.g., stored in a library of MT(s) 130). An MT 130 comprises compatible test(s) for a specific device and can employ the action object(s) 120 to perform test(s). Action object(s) 120 can have synchronous method(s) of controlling a target, where MTs 130 have asynchronous control.

In one example, each MT 130 contains the code of a common test scenario (a set of action(s)) necessary to control a specific device, and provides an interface with method(s) to control that test. MT(s) 130 are controllable at runtime (e.g., start, stop, pause, resume, change test input etc.). Unlike traditional tests, MT(s) 130 can be started, paused, and restarted while maintaining state.

Thus, the MT(s) 130 can be a set of core, target-specific test components. MT(s) 130 can be small test components that focus on one particular functional test for a specific piece of hardware. For example, there can be a family of "SimpleIO" MT(s) 130 for USB devices, 1394 devices, mass storage etc. The MT(s) 130 allow run time control such as pause, restart, throttle-up, throttle-down etc.

In one example, the MT(s) can be COM and/or .NET object(s) and support a simple interface such as open, test and/or close. Core test(s) for a specific technology can descend from a "Manageable Test" class and can extend the interface to provide test specific methods. For example, a "SimpleIO" class can extend the class by adding the Read( ) and Write( ) Methods. In one example, each MT 130 is a plug-in which allows for the addition of MT 130 implementations of existing MT class(es) and/or the addition of custom-defined MT class(es).

As discussed herein, the primary framework infrastructure objects have method(s) to query for and then run MT(s) 130 based on the device(s) found on the system. These queries can find MT(s) 130 that apply to the functionality being tested and the device being tested. These queries can return a collection of MT(s) 130 (e.g., core test(s)) that can be run and controlled (e.g., at the script level). These MT(s) 130 (e.g., core test object(s)) generally require in-depth knowledge of a specific hardware device. Additionally and/or alternatively, the MT(s) can include scripts that use the framework 100 objects. This facilitates simple re-use and componentization of existing scripts. In one example, there is a hierarchy MT(s) 130 in which a root test can manage one or more child MT(s) 130.

An MT 130 generally exports at least one interface to be compatible with the MT test depot 240. Further each MT 130 can provide a main control interface that a script writer can use to control the test run for the particular MT 130.

Device Depot Object 230

Again referring to FIG. 2, the framework 100 can further, optionally, include a device depot 230 that is an object that represents the meta-collection of device(s) attached to the system. The device depot 230 can be queried for device(s) that have certain characteristics (e.g., class, capability, name, and/or other descriptive information). In a device test scenario 140, a tester can run queries to return a specific device or a set of devices with common characteristics, for example, device(s) that meet certain criteria. For example, the following query returns a device collection 220 of CD-ROM devices:

DeviceCollection=DeviceDepot.Query
("DeviceClass=CD_ROM").

Continuing with this example, once the query populates the device collection 220, a test (e.g., script) can iterate through the members to manipulate each, run manageable test(s) 130 on each, or examine their metadata.

With the abstraction provided by the framework 100, test developer(s) are able to write device test scenarios that are device class independent. For the scenario writer, the framework 100 abstracts the details of controlling actions across device classes. This enables performing actions on one or more devices that have similar functionality as a group, without having to worry about implementing code to take into account the differences between individual devices. The device depot object 230 can inherit the method of the target collection object(s) 220. In one example, the device depot 230 includes the following method and events:

TABLE 3

| DeviceDepot Events | |
| --- | --- |
| RequestMatchEvents | Given a query constraint for a set of devices, this event will be signed for every device that matches the constraints now or in the future. |
| MatchFound | A new device has arrived. |
| MatchLost | A device that was previously matched no longer matches. |
| QueryRemoveEvent | An event signaling a "QueryRemove" of a device. |

Optionally, user(s) can extend the framework 100 by creating and/or storing MT(s) 130 and/or action object(s) 120. The framework 100 provides a model for shared development of driver tests. Test developers can use the framework 100 pieces in conjunction with small, device specific functionality test components that they develop to extend the framework 100. These device specific functionality tests can be added to the library of available framework provided tests, and enable script writers to create new tests from these components.

Overview of the Framework 100

From the scenario writer's perspective, the framework 100 allows the scenario writer to do several basic types of activities. First, the framework can allow the scenario writer to discover device(s) attached to the system. For example, the device(s) can be found by technology (e.g., USB, Bluetooth, etc.), by device class (e.g., storage device, HID, etc.) and/or by other criteria. The scenario writer can even identify a single device by name and/or search for device(s) by multiple criteria. In addition, the scenario writer can search for device(s) necessary to run a particular test and/or for device(s) that are related to each other (e.g., via parent-child, graph relationships, etc.) Optionally, the framework 100 further allows a scenario writer to create collection(s) of device objects in order to act on them as one.

Additionally, a scenario writer can perform action(s) on one or more devices that have similar functionality as a group, without having to worry about the differences between individual devices. For example, a scenario writer can enable or disable a collection of devices, with a single line of script, even though the underlying code to implement this action may be different for each particular device 110. In addition, the scenario writer can cycle a collection of devices through several power management states and record the results. The framework 100 finds and associates the underlying code with a specific device 110.

Next, a scenario writer can run basic functionality tests for a collection of devices, without worrying about the code needed to test each specific device. For example, the scenario writer can run a simple IO test that opens a device/file, writes some data, reads some data, and closes the device/file.

Even though the code needed to do this is different for different devices, the scenario writer only needs to write a few simple lines of code to run the test. The framework 100 understands what actions must be done in order to run the test for each type of hardware, and associates the underlying code with a specific device 110.

The framework 100 can, optionally, write results to a common log 150. In addition, many of the actions and tests can also write status and result information to the log 150 automatically.

Finally, scenario writer(s) can programmatically, stop, restart, or pause a core functionality test. Traditionally, hardware test scripts consist of large C language programs that once started, run until complete. If the test is stopped for any reason, any state information was lost, and the test must be started over from the beginning. Some tests may take many hours to run to completion, and could not be restarted after detecting a problem. The MT(s) 130 can preserve state information and can be paused and restarted to continue testing.

For example a scenario writer can write a simple device test scenario 140 (e.g., script) that:

Finds all the devices attached to the system;

Queries the system for devices that can wake the system;

Controls any one or all of these devices by calling method(s) of the Target object (for example Enable( ), Disable( ) );

Manipulates the system using other framework 100 objects (for example SystemPower.Suspend( ));

Automatically discovers MT(s) 130 (e.g., pre-existing "core" test(s)) that apply to the type of device under test and relate to the current scenario;

Runs any or all of those MT(s) 130 (e.g., pre-existing "core" tests);

Writes the results to a common log 150 in a predictable way.

Additionally, while the test is running a tester can pause and resume the test; and/or modify the test environment and supply parameter(s) to the test interactively.

Plug-In Related Objects

As noted previously, the framework 100 can, optionally, include a mapping component 250 object that maintains associations between objects and other objects (e.g., device(s) 110 to MT(s) 130, MT(s) 130 to device(s) 110, device(s) 110 to action object(s) 120, action object(s) 120 to device(s) 110, utility plug-ins to MT(s) 130, and/or MT(s) 130 to plug-ins). In one example, the mapping component 250 has two main functions. First, the mapping component 250 associates MT(s) 130 with the device(s) 110 to which they apply. For example, the plug-in mapper 250 can be used to return all, some, or one of the MT(s) 130 (e.g., core test(s)) associated with a particular device 110. Second, the plug-in mapper 250 associates method implementations with the methods on target object(s) 210. When a scenario writer calls a method on the target object collection 220, the implementation of each method can be different for different types of device(s) 110. The mapping component 250 can hold the mapping information between them.

Thus, in this example, the mapping component 250 holds the mapping between the MT(s) 130 and associated device(s) 110, and, method implementations with the methods on target object(s) 210. These mappings can be updated over time as association(s) are added, deleted and/or modified.

Service Components

The framework 100 can, optionally, include an aggregation object 280 that allows scenario writers to instantiate other framework 100 objects and can also contain some framework wide utility functions.

Further, the framework can include an evaluation component 290 that can re-phrase queries for device(s), test(s), and/or action object(s) 120 to access the data from wherever it is stored. This "service" provides a consistent way to query for data, and enables the same query language to be used by script writers as well as internally by the framework components. The evaluation component 290 can be, essentially, a layer between the target object(s) 210 and the device(s) 110.

For example, the device depot 230 can use the evaluation component 290 to support a scenario writer trying to query for a subset of target object(s) 210 from the collection of all devices. It can load the evaluation component 290 in-process and use it to turn query strings from the scenario writer into tokenized query expression tree objects.

Finally, the framework 100 can include a device and system data store that presents device and system data that is contained in other disparate components (e.g., various gatherers, sysparse gatherers, the system data store, the device to device mapping service, metadata plug-ins etc.).

Creating Scenario Scripts with the Framework 100

In one example, a scenario writer can create a script that uses a .NET scripting language to control the framework 100 objects. These scripts can range from very simple to complex, and represent test cases and test case scenarios. The framework 100 does not provide a scripting language but supports programming the framework objects by using, for example, VB Script, C#, or C++.

The following example scenario script employs framework 100 objects, MT(s) 130 and action object(s) 120 to manipulate and test devices attached to a computer.

TABLE 4

```
' Define object/variables
Dim DeviceDepot
Dim DeviceCollection
Dim Device
Dim SimpleIO
' Init objects
' Get reference for the DeviceDepot into this script.
Set DeviceDepot = CreateObject("DTF.DeviceDepot")
' Query for some device(s)
Set DeviceCollection = DeviceDepot.Query("Class=disk");
' Enumerate all devices in the DeviceCollection
For Each Device in DeviceCollection
   ' Print out the name of the device
   Wscript.Echo Device.GetValue("#displayName")
   ' Get Disable/Enable Action
   DisEn = Device.GetInterface("Action/DisEn")
   If DisEn < > 0 then
      'Use Disable/Enable Action to disable and enable devices.
      DisEn.Disable( )
      DisEn.Enable( )
   EndIf
   ' Get a device specific MTest for the Device
   SimpleIO = Device.GetInterface("MTest/SimpleIO")
   ' Use the Simple I/O MTest
   SimpleIO.Start( )
   WScript.Sleep(100)
   SimpleIO.Stop( )
Next
'End
```

It is to be appreciated that the target test framework 100, the device(s) 110, the action object(s) 120, the manageable test(s) 130, the device test scenario 140, the log 150, the target object(s) 210, the target collection object 220, the device depot 230, the mapping component 250, the aggregation component 280 and/or the evaluation component 290 can be computer components as that term is defined herein.

Figure 3:
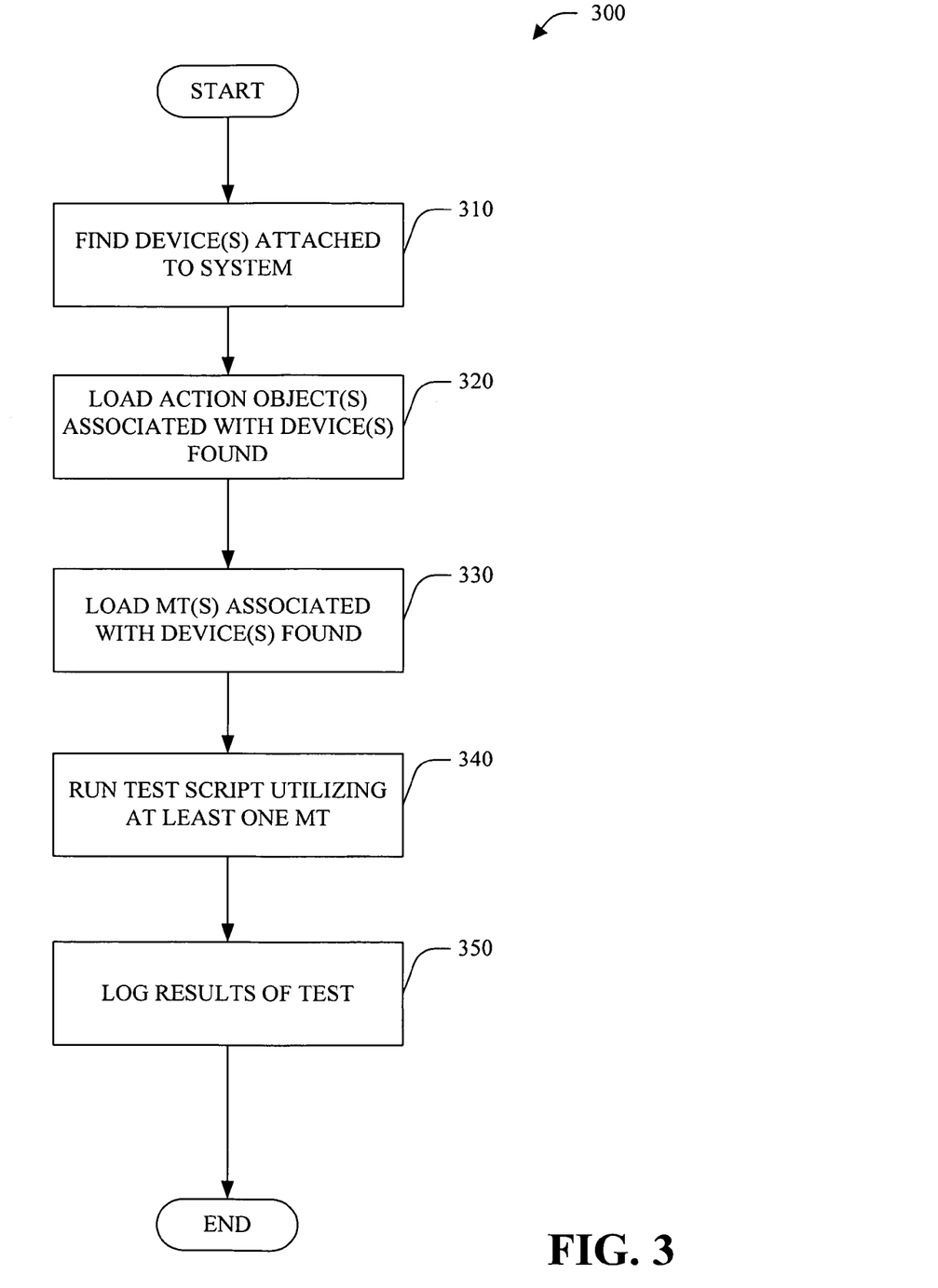
FIG. 3 is a flow chart of a device test method.

Turning briefly to FIG. 3, a methodology that may be implemented in accordance with the claimed subject matter are illustrated. While, for purposes of simplicity of explanation, the methodologies are shown and described as a series of blocks, it is to be understood and appreciated that the claimed subject matter is not limited by the order of the blocks, as some blocks may, in accordance with the claimed subject matter, occur in different orders and/or concurrently with other blocks from that shown and described herein. Moreover, not all illustrated blocks may be required to implement the methodology.

The claimed subject matter may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 3, a device test method 300 is illustrated. At 310, device(s) attached to the system are found. At 320, action object(s) associated the device(s) found are loaded. At 330, manageable test(s) associated with the device(s) found are loaded.

At 340, a test script is run utilizing at least one manageable test. At 350 results of the manageable test are stored in a log.

Figure 4:
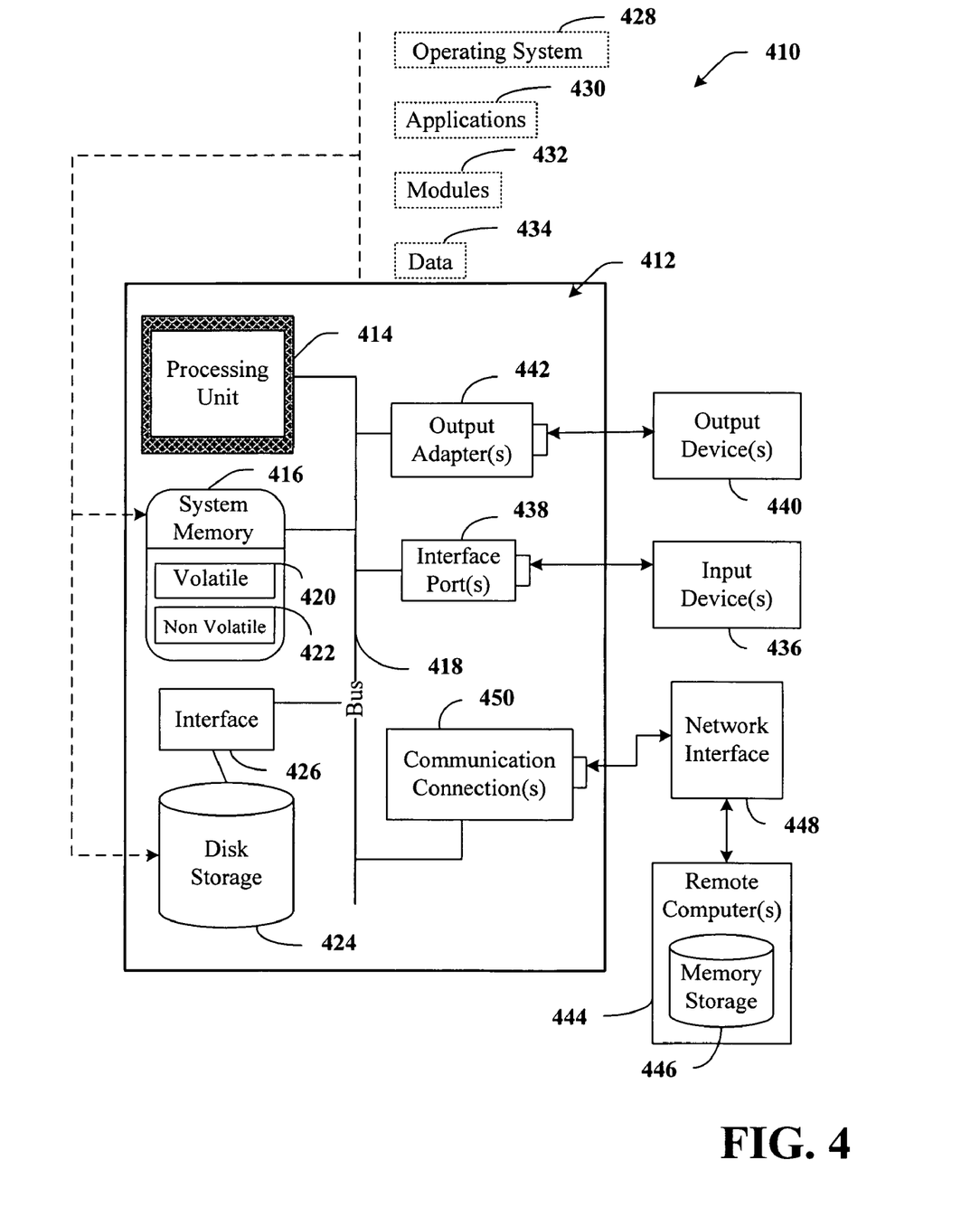
FIG. 4 illustrates an example operating environment.

In order to provide additional context for various aspects of the claimed subject matter, FIG. 4 and the following discussion are intended to provide a brief, general description of a suitable operating environment 410. While the claimed subject matter is described in the general context of computer-executable instructions, such as program modules, executed by one or more computers or other devices, those skilled in the art will recognize that the claimed subject matter can also be implemented in combination with other program modules and/or as a combination of hardware and software. Generally, however, program modules include routines, programs, objects, components, data structures, etc. that perform particular tasks or implement particular data types. The operating environment 410 is only one example of a suitable operating environment and is not intended to suggest any limitation as to the scope of use or functionality of the claimed subject matter. Other well known computer systems, environments, and/or configurations that may be suitable for use with the claimed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 4, an exemplary environment 410 includes a computer 412. The computer 412 includes a processing unit 414, a system memory 416, and a system bus 418. The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 416 includes volatile memory 420 and nonvolatile memory 422. The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable ROM (EEPROM), or flash memory. Volatile memory 420 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 412 also includes removable/nonremovable, volatile/nonvolatile computer storage media. FIG. 4 illustrates, for example a disk storage 424. Disk storage 424 includes, but is not limited to, devices like a magnetic disk drive, floppy disk drive, tape drive, Jaz drive, Zip drive, LS-100 drive, flash memory card, or memory stick. In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in suitable operating environment 410. Such software includes an operating system 428. Operating system 428, which can be stored on disk storage 424, acts to control and allocate resources of the computer system 412. System applications 430 take advantage of the management of resources by operating system 428 through program modules 432 and program data 434 stored either in system memory 416 or on disk storage 424. It is to be appreciated that the claimed subject matter can be implemented with various operating systems or combinations of operating systems.

A user enters commands or information into the computer 412 through input device(s) 436. Input devices 436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 414 through the system bus 418 via interface port(s) 438. Interface port(s) 438 include, for example, a serial port, a parallel port, a game port, and a universal serial bus (USB). Output device(s) 440 use some of the same type of ports as input device(s) 436. Thus, for example, a USB port may be used to provide input to computer 412, and to output information from computer 412 to an output device 440. Output adapter 442 is provided to illustrate that there are some output devices 440 like monitors, speakers, and printers among other output devices 440 that require special adapters. The output adapters 442 include, by way of illustration and not limitation, video and sound cards that provide a means of connection between the output device 440 and the system bus 418. It should be noted that other devices and/or systems of devices provide both input and output capabilities such as remote computer(s) 444.

Computer 412 can operate in a networked environment using logical connections to one or more remote computers, such as remote computer(s) 444. The remote computer(s) 444 can be a personal computer, a server, a router, a network PC, a workstation, a microprocessor based appliance, a peer device or other common network node and the like, and typically includes many or all of the elements described relative to computer 412. For purposes of brevity, only a memory storage device 446 is illustrated with remote computer(s) 444. Remote computer(s) 444 is logically connected to computer 412 through a network interface 448 and then physically connected via communication connection 450. Network interface 448 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to computer 412. The hardware/software necessary for connection to the network interface 448 includes, for exemplary purposes only, internal and external technologies such as, modems including regular telephone grade modems, cable modems and DSL modems, ISDN adapters, and Ethernet cards.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A target test framework comprising:
   at least one dynamic target object which represents a target of testing;
   an evaluation component that collects, stores and provides dynamic data about targets of testing;
   a mapping component that matches implementations of interfaces based on the dynamic data associated with the targets of testing, the dynamic data utilized to one of enable or disable the targets of testing through one or more power management state; and
   a device depot object that represents a meta-collection of devices attached to a computer system.

2. The framework of claim 1, further comprising at least one manageable test that comprises code of a test scenario to control a specific device and further provides an interface to control that test scenario, the at least one manageable test employs an action object to perform the test scenario.

3. The framework of claim 2, the at least one manageable test is controllable at runtime.

4. The framework of claim 2, the at least one manageable test is a plug-in which allows for the addition of manageable test implementations of existing manageable test class(es) and/or the addition of custom-defined manageable test class (es).

5. The framework of claim 2, the at least one manageable test can be started, paused and restarted while maintaining state.

6. The framework of claim 1, further comprising an action object that comprises code to control a specific device and further provides an interface to control the specific device.

7. The framework of claim 1, the at least one dynamic target object comprising a method to retrieve related target object(s).

8. The framework of claim 1, the at least one dynamic target object comprising a method to retrieve a dynamic property of the target.

9. The framework of claim 1, the at least one dynamic target object comprises a method to dynamically locate an action object for the target.

10. The framework of claim 1, the at least one dynamic target object comprises a method to dynamically locate a manageable test for the target.

11. The framework of claim 1, the at least one dynamic target object comprises a method to that determines whether a target matches a specified set of property values.

12. The framework of claim 1, further comprising a target collection object that contains one or more target object(s), the target collection object enabling a test scenario component to operate on a collection of devices simultaneously as a group.

13. The framework of claim 12, the target collection object comprising a method to enumerate target object(s) in the collection of devices.

14. The framework of claim 12, the target collection object comprising a method to retrieve a sub-set of the contained one or more target object based upon a set of property values.

15. The framework of claim 1, where devices, systems, applications and/or services are targets of testing.

* * * * *